United States Patent
Keenum et al.

(10) Patent No.: US 9,523,829 B2
(45) Date of Patent: Dec. 20, 2016

(54) FIBER OPTIC CABLE SUB-ASSEMBLIES WITH STRAIN-RELIEF TO A CIRCUIT BOARD AND METHODS OF ASSEMBLING

(71) Applicants: John Austin Keenum, Keller, TX (US); Brett Allen Menke, Haslet, TX (US); Edward Joseph Reed, North Richland Hills, TX (US); Rodger Alan Tenholder, Saginaw, TX (US); Gary Richard Trott, San Mateo, CA (US)

(72) Inventors: John Austin Keenum, Keller, TX (US); Brett Allen Menke, Haslet, TX (US); Edward Joseph Reed, North Richland Hills, TX (US); Rodger Alan Tenholder, Saginaw, TX (US); Gary Richard Trott, San Mateo, CA (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 684 days.

(21) Appl. No.: 13/655,104

(22) Filed: Oct. 18, 2012

(65) Prior Publication Data
US 2014/0112628 A1 Apr. 24, 2014

(51) Int. Cl.
*H05K 3/00* (2006.01)
*G02B 6/00* (2006.01)
(Continued)

(52) U.S. Cl.
CPC .......... *G02B 6/428* (2013.01); *Y10T 29/49124* (2015.01)

(58) Field of Classification Search
CPC ...... Y10T 29/49124; G02B 6/428; G02B 6/42
(Continued)

(56) References Cited

U.S. PATENT DOCUMENTS

| | | | | |
|---|---|---|---|---|
| 5,291,368 A | * | 3/1994 | Conroy-Wass | H05K 7/183 361/690 |
| 5,339,221 A | * | 8/1994 | Conroy-Wass | H05K 7/1424 361/784 |

(Continued)

FOREIGN PATENT DOCUMENTS

| | | |
|---|---|---|
| CN | 1075233 | 8/1993 |
| CN | 1098507 | 2/1995 |
| CN | 101361013 | 8/2013 |

OTHER PUBLICATIONS

Patent Cooperation Treaty Form ISA/210, International Application No. PCT/US2013/061526, mailing date Nov. 26, 2013—4 pages.
(Continued)

*Primary Examiner* — Akm Enayet Ullah

(57) ABSTRACT

Fiber optic cable sub-assemblies having a fiber optic cable including at least one optical fiber attached to a circuit board are disclosed. The circuit board includes an active optical component in operable communication with the optical fiber for forming an active optical cable (AOC) assembly. A strain relief device attaches an end portion of the fiber optic cable to the circuit board, thereby forming the cable sub-assembly. Methods of assembling the fiber optic cable sub-assembly are also disclosed and include the step of attaching an end portion of the fiber optic cable to the circuit board.

25 Claims, 7 Drawing Sheets

(51) Int. Cl.
*G02B 6/36* (2006.01)
*G02B 6/42* (2006.01)

(58) Field of Classification Search
USPC ............... 385/80–90, 92, 147, 900, 14, 24
See application file for complete search history.

(56) References Cited

U.S. PATENT DOCUMENTS

| | | | | |
|---|---|---|---|---|
| 6,084,178 | A * | 7/2000 | Cromwell | ............... H01L 23/32 |
| | | | | 174/16.3 |
| 6,817,896 | B2 | 11/2004 | Derenthal | ...................... 439/578 |
| 9,310,572 | B2 * | 4/2016 | Keenum | ................ G02B 6/428 |
| 2007/0206906 | A1 * | 9/2007 | Stark et al. | ...................... 385/89 |
| 2008/0085090 | A1 | 4/2008 | Meek et al. | |
| 2011/0123150 | A1 * | 5/2011 | Zbinden et al. | ................. 385/33 |
| 2011/0221609 | A1 * | 9/2011 | Aguren | ............... G02B 6/4246 |
| | | | | 340/687 |
| 2012/0027364 | A1 * | 2/2012 | Tamura | ................ G02B 6/4201 |
| | | | | 385/92 |
| 2013/0034329 | A1 | 2/2013 | Tucker et al. | ................... 385/94 |
| 2014/0112632 | A1 * | 4/2014 | Keenum | ................ G02B 6/428 |
| | | | | 385/139 |
| 2014/0348471 | A1 * | 11/2014 | Cole | ...................... H05K 1/144 |
| | | | | 385/89 |

OTHER PUBLICATIONS

Patent Cooperation Treaty Form ISA/237, International Application No. PCT/US2013/061526, mailing date Nov. 26, 2013—7 pages.
CN201380058329.7 First Office Action Dated Mar. 10, 2016.
EP13782913.1 Office Action Dated Jun. 1, 2015.
International Search Report and Written Opinion of the International Searching Authority; PCT/US2013/064526; Mailed Nov. 26, 2013; 12 Pages.

* cited by examiner

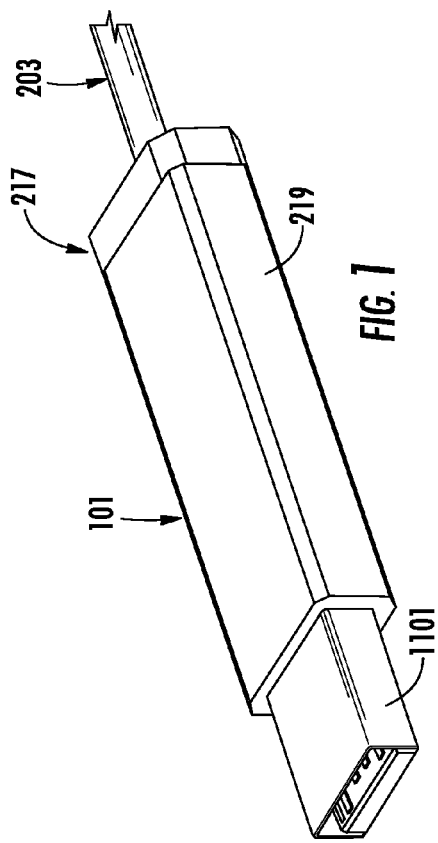
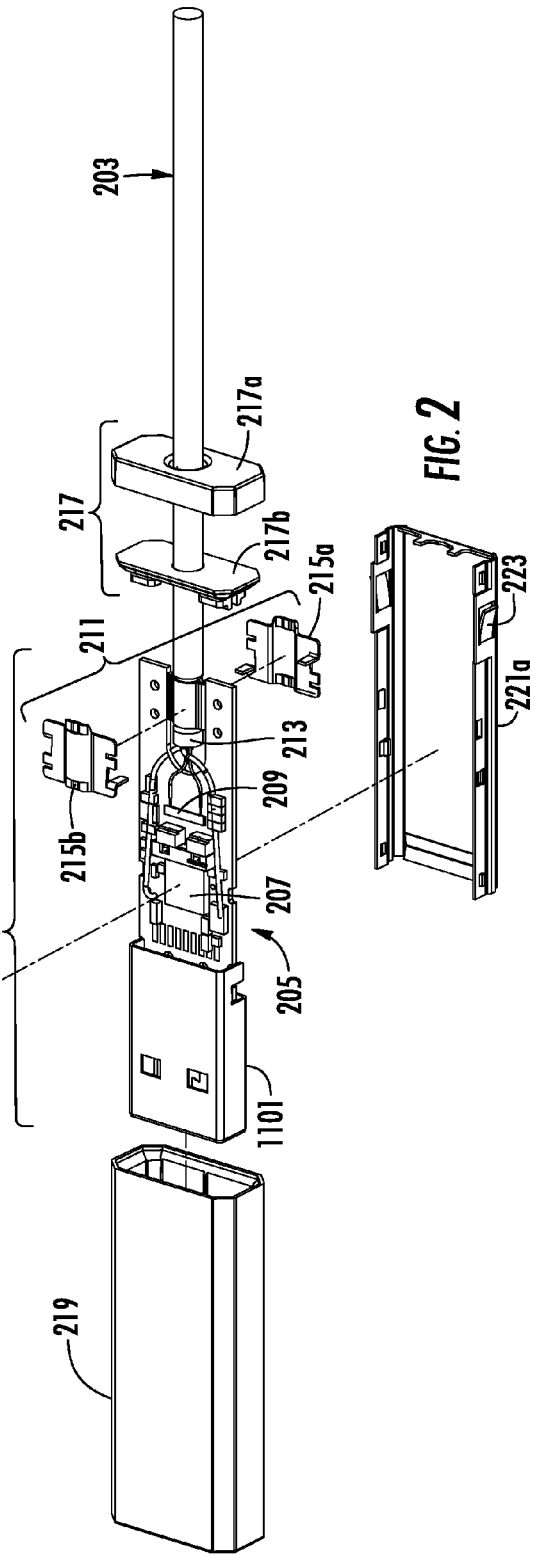

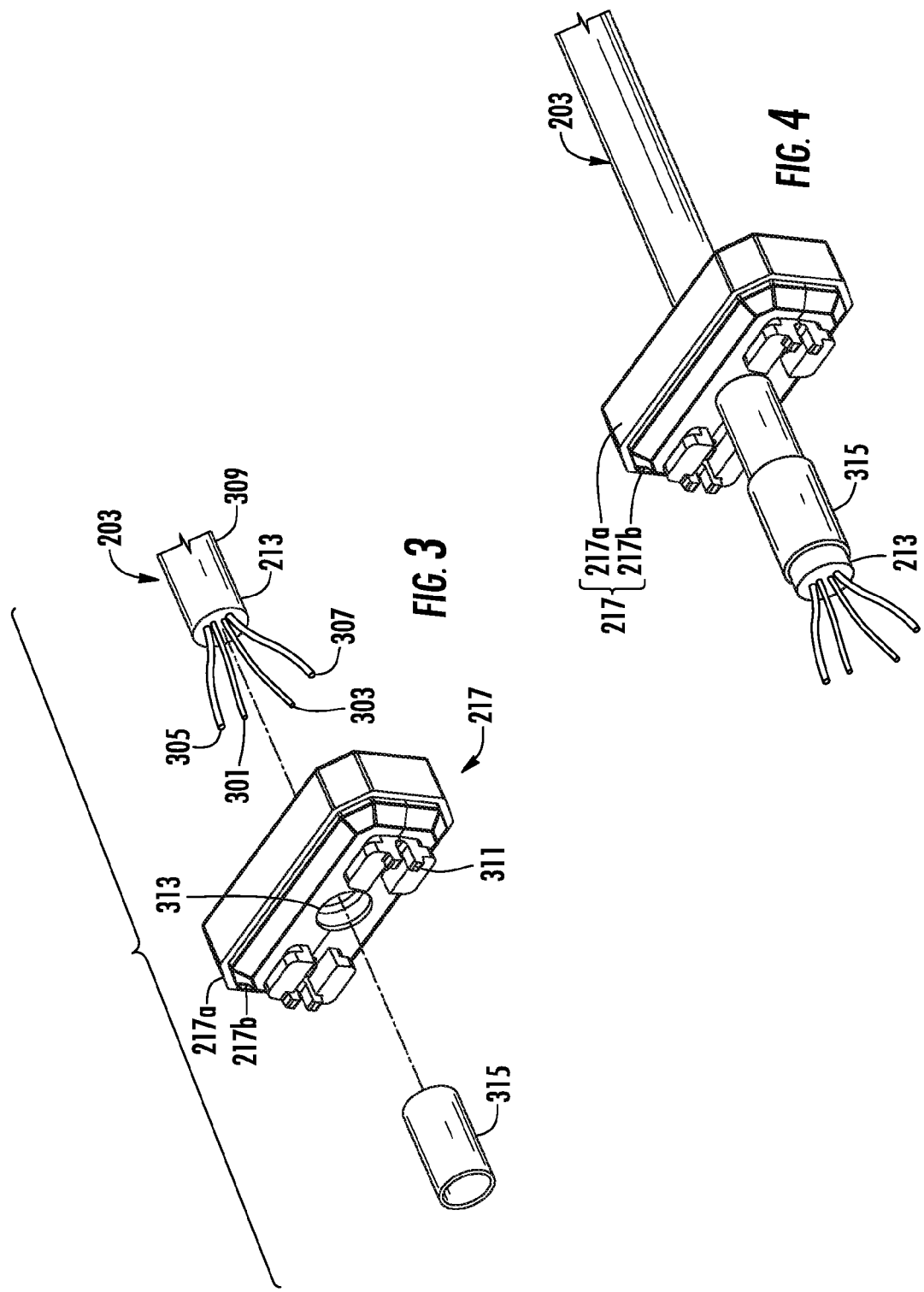

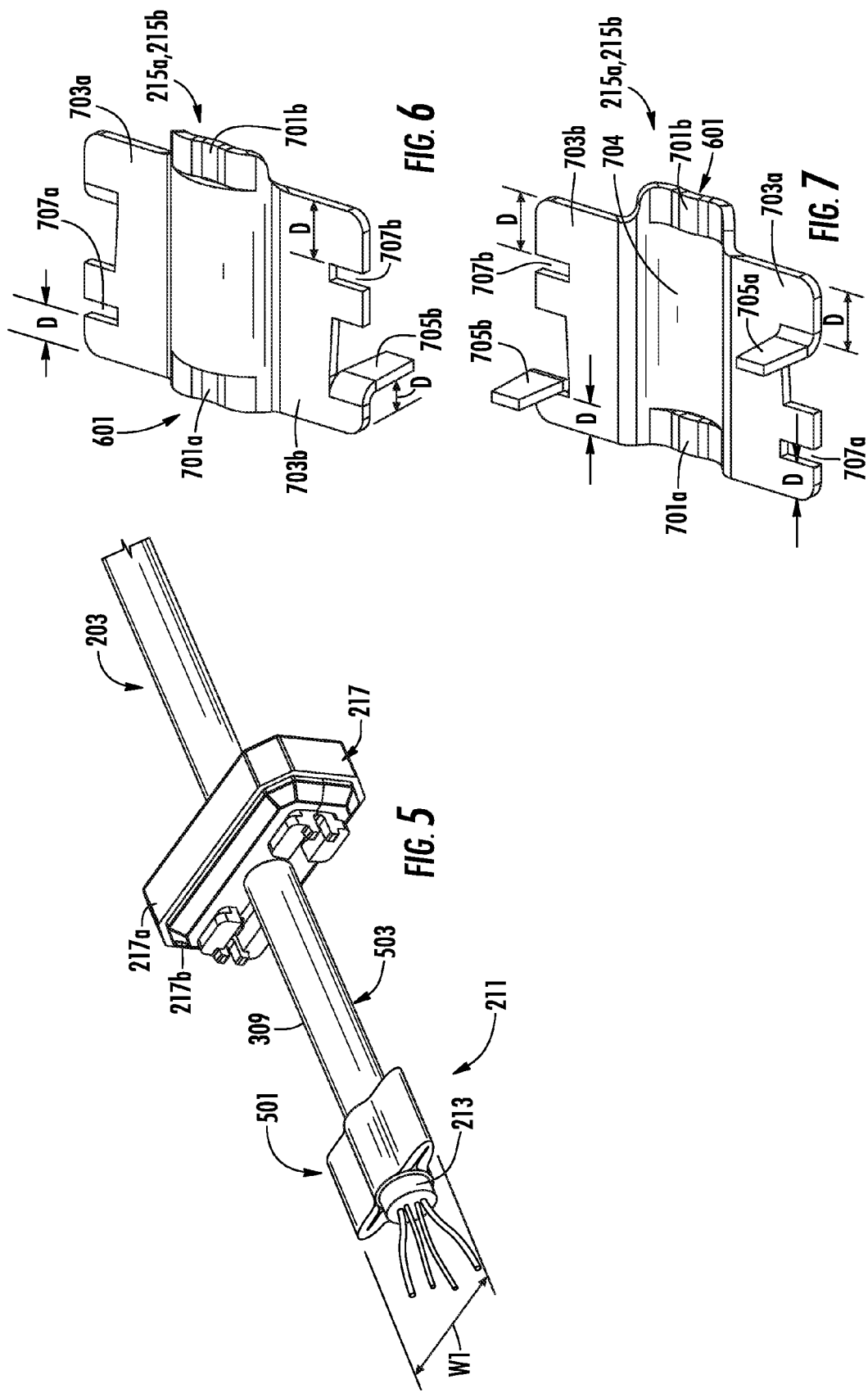

FIBER OPTIC CABLE SUB-ASSEMBLIES WITH STRAIN-RELIEF TO A CIRCUIT BOARD AND METHODS OF ASSEMBLING

BACKGROUND

Field of the Invention

The present invention relates generally to fiber optic cable sub-assemblies and methods of assembling and, more particularly, to fiber optic cable sub-assemblies including a strain relief device for attaching an end portion of a fiber optic cable to a circuit board.

Technical Background

Fiber optic cables are known for their ability to transmit data at faster rates than cables having electrical conductors. Typically, fiber optic cables have been used in telecommunication networks, data centers, private network and the like. However, with the increasing demand for high-speed data transmission for consumer electronic devices such as smart phones, tablets, laptop computers, digital cameras, video displays such as televisions and the like fiber optic cables are being considered for replacing conventional electrical cables for high-speed data transmission applications.

Consequently, new fiber optic cables are being developed for attaching and making optical connections with electronic devices such as host and client devices. For example, many consumer electronic devices have one or more Universal Serial Bus (USB) electrical ports for establishing an electrical connection with an external device. The latest USB specification (USB 3.0) supports a data rate of 5 Gb/s, which is ten times faster than the previous USB specification (USB 2.0), and this latest version is still backwards compatible with the USB 2.0. As fiber optic cable designs begin to migrate into this space to support faster data rates, they still must be backwards compatible with the installed base of USB ports. Active optic cable (AOC) assemblies allow the use of the optical fibers as the transmission medium between the connectors on the ends of the cable instead of the conventional copper wires; however, the optical signals conveyed by the optical fibers are converted into electrical signals (i.e., optical-to-electrical (O-E) conversion) and vice versa (i.e., electrical-to-optical (E-O) conversion) so that the connector has an electrical interface to be compatible with the installed base of consumer devices.

In other words, for an AOC fiber-optic cable to be connected to a USB port, it must be terminated with a USB electrical interface configured for transmitting electrical signals at the port connection. Unlike a fiber optic cable used for telecommunications that experiences relatively few connections and disconnections in a controlled environment, a fiber optic cable use for consumer applications will experience frequent connections and disconnections in a variety of environments. Consequently, the mechanical connection between the fiber optic cable and the connector that terminates the cable must be robust for the large number of mating/unmating cycles expected over its lifetime.

Conventional fiber optic cable assemblies typically employ a crimp band that is secured (i.e., crimped) to a crimp body disposed on the end portion of the fiber optic cable. Typically, the strength members of the fiber optic cable are exposed and disposed between a barrel of the crimp body and secured to the same using the crimp band for strain relieving the cable to the connector such that pulling forces on the cable are transferred to the connector housing so stress and/or strain is not transmitted to the optical fiber. Such conventional strain relief configurations can add considerably to the overall length of the connector housing and are not suitable for active optic cable (AOC) assemblies since the connector footprint is different. Consequently, there is an unresolved need for a strain-relief assembly for securing a fiber optic cable to a sub-assembly of an active optic cable assembly or the like in a quick, reliable and cost-effective manner.

SUMMARY

The present disclosure is directed to fiber optic cable sub-assemblies that attach a fiber optic cable to a circuit board. In one explanatory aspect a fiber optic cable sub-assembly comprises a fiber optic cable including at least one optical fiber and a circuit board with an active optical component in operable communication with the optical fiber. A strain relief device attaches an end portion of the fiber optic cable to the circuit board. In another embodiment, the circuit board includes an opening and an end portion of the fiber optic cable is at least partially positioned within the opening of the circuit board.

In another example aspect, a fiber optic cable assembly comprises a fiber optic cable including at least one optical fiber and a first fiber optic sub-assembly including a first circuit board with an active optical component in operable communication with a first end of the optical fiber. A first strain relief device attaches a first end portion of the fiber optic cable to the first circuit board.

In still another example aspect, a method of assembling a fiber optic cable sub-assembly comprises the step (I) of operably attaching an optical fiber of a fiber optic cable to an active optical component of a circuit board. The method further includes the step (II) of attaching an end portion of the fiber optic cable to the circuit board.

BRIEF DESCRIPTION OF THE DRAWINGS

These and other features, aspects and advantages of the present invention are better understood when the following detailed description of the invention is read with reference to the accompanying drawings, in which:

FIG. 1 is a perspective view of an assembled end of an explanatory fiber optic cable assembly;

FIG. 2 is a partially exploded view of the fiber optic cable assembly of FIG. 1;

FIG. 3 is a partially exploded view of portions of the fiber optic cable assembly of FIG. 1 including an end portion of a fiber optic cable, an end cap device, and a sleeve of an example strain relieve device;

FIG. 4 illustrates a step of inserting the end portion of the fiber optic cable through the end cap device and through the sleeve of FIG. 3;

FIG. 5 illustrates the sleeve of FIG. 4 being clamped to the end portion of the fiber optic cable;

FIG. 6 illustrates a top perspective view of an example mounting bracket of the example strain relieve device;

FIG. 7 illustrates a bottom perspective view of the mounting bracket of FIG. 6;

DETAILED DESCRIPTION OF THE INVENTION

Figure 8:
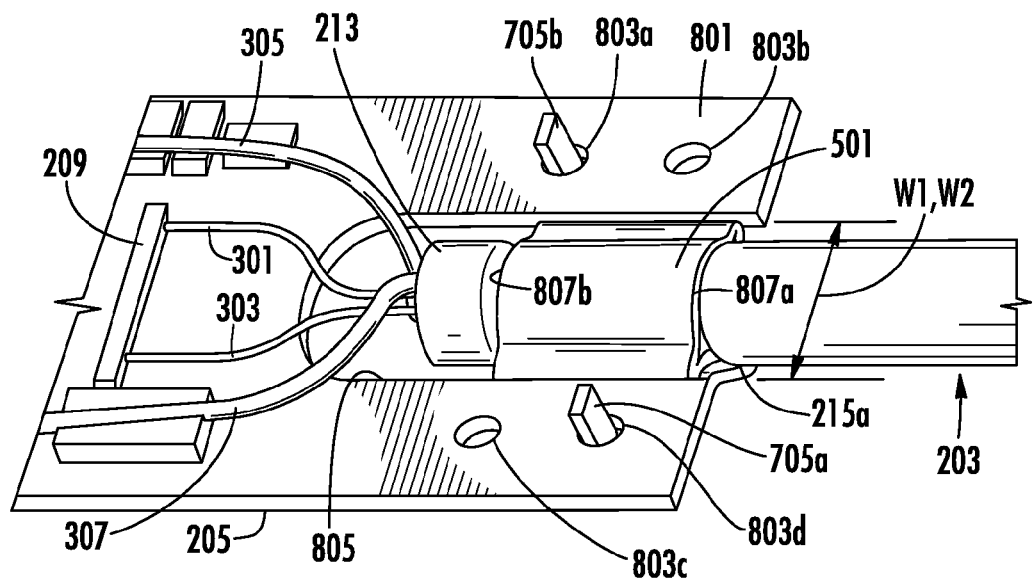
FIG. 8 illustrates a first mounting bracket being positioned with respect to a circuit board for attaching the end portion of the fiber optic cable to the circuit board.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Although described with respect to an active optical cable (AOC) sub-assemblies and cables, the concepts of the disclosure may be used with any suitable cable having a communication element such as an electrical conductor or optical fiber. For instance, the sub-assembly may be a passive optical cable assembly or an active electrical cable assembly having a circuit board secured to a cable and/or be in communication with the communication element. A passive optical cable assembly has connectors with an optical interface and may include electrical connections as desired. On the other hand, the AOC converts an inputted electrical signal at the connector interface to an optical signal (i.e., an electromagnetic signal) appropriate for transmission along the optical fibers and then converts the transmitted optical signal to an electrical signal at the output side at the other connector interface. In other examples, the electromagnetic signal can comprise RF signals (e.g., at 160 GHz) or other suitable signals. AOC assemblies may include an active optical component such as integrated chips, photodiodes, VCSEL and/or other electro-optic active components at or near the connector for converting optical signals to electrical signals and vice-versa. The active components may be aligned with a total internal reflection (TIR) block, a lead frame, ferrule or other structure for aligning and transmitting/receiving the optical signals to the active components without undue signal loss. The TIR block, lead frame, ferrule or the like receive and are attached to one or more optical fibers for providing optical communication to active components.

By way of illustration purposes, FIG. 1 shows an assembled end of an explanatory fiber optic cable assembly 101 having an AOC connector attached to a fiber optic cable. Specifically, FIG. 1 shows fiber optic cable assembly 101 having a standard A USB configuration, but other configurations are possible such as Micro-B, receptacle A or even other non-USB protocols according to the concepts of the application. Example features of the fiber optic cable assembly 101 are illustrated with initial reference to the exploded view shown in FIG. 2. Specifically, the fiber optic cable assembly 101 includes a fiber optic cable sub-assembly 201 comprising a fiber optic cable 203. Although the concepts are described in detail for attaching fiber optic cables to circuit boards the concepts may be used for attaching electrical cables as well.

As shown in FIG. 3, the fiber optic cable 203 can include at least one optical fiber such as the first optical fiber 301 and the second optical fiber 303 illustrated in FIG. 3. While two optical fibers are illustrated, further examples of fiber optic cables can include a single optical fiber or more than two optical fibers such as four optical fibers as desired. The at least one optical fiber 301, 303 is configured to transmit light across a fiber length between opposed ends of the fiber optic cable assembly 101. As further illustrated in FIG. 3, the fiber optic cable 203 can also include optional electrical wires 305, 307 that may be configured to provide electrical power to components of a circuit board 205 or allow power or data signals to be passed through the fiber optic cable 203. While electrical wires 305, 307 may comprise two wires as shown, and in further examples a single conducting cable may be provided or more than two wires may be provided as desired.

Still referring to FIG. 3, the fiber optic cable 203 may further include a cable jacket 309 housing the at least one optical fiber 301, 303. As further shown, the cable jacket 309 may also house electrical wires 305, 307 if provided. The cable jacket 309 can at least partially encapsulate one or more of the optical fibers 301, 303 and/or the electrical wires 305, 307. Alternatively, or in addition, the cable jacket 309 may optionally define an internal through passage (i.e., a cavity) configured to receive one or more of the optical fibers 301, 303 and/or the electrical wires 305, 307. The cable jacket 309 can comprise rubber, plastic, resin or other suitable material configured to insulate and/or protect optical fibers 301, 303 and/or the electrical wires 305, 307 from damage. Although not shown, the cable jacket 309 may also be provided with one or more optional strength members, such as Kevlar® material or metal wires to further strengthen the cable jacket 309 by increasing the strength and/or helping maintain a minimum bend radius for the fiber optic cable. Simply stated, the concepts disclosed herein may be used with any suitable cable type, construction and/or decorative feature as desired. As an example of a decorative feature, the cable jacket may have any suitable color such as black, white or transparent as desired.

As shown in FIG. 2, the fiber optic cable sub-assembly 201 includes a circuit board 205, such as a printed circuit board (PCB) or other circuit board configuration. In this embodiment, circuit board 205 includes an electro-optical (EO) active component 207 in operable (i.e., optical) communication with the optical fiber 301, 303. Example active optical components 207 can comprise RF chips, photodiodes, VCSEL and/or other components at or near the connector for EO conversion of optical signals to electrical signals or vice versa. As further shown, the optical fibers 301, 303 may be integrated with the circuit board by way of a lead frame 209 although a total internal reflection (TIR) block, ferrule or other structure may be used to integrate the optical fibers with the circuit board. In such examples, the lead frame 209, TIR block, ferrule or the like receive and are attached to one or more of the optical fibers 301, 303. In other words, the optical fibers are attached to a structure that aligns and supports the optical fibers so that the optical signals are directed to/from the active components for transferring the signal.

The circuit board 205 can comprise any support member configured to mechanically support and electrically connect electrical components. For example, a circuit board can comprise electrical connections such as conductive pathways, signal traces, tracks, wires or other configurations provided on a nonconductive substrate 801 (i.e., a dielectric substrate). As shown in FIG. 8, the nonconductive substrate 801 may comprise plastic material, resin, composite material (e.g., fiberglass) or other structures configured to mechanically support and electrically connect electrical members. In one example, the circuit board can use lithography to define the electrical patterns. In further examples, the circuit board (e.g., printed circuit board) can include printed conductive traces that may be applied by low resolution inkjet although other printing techniques may be used in further examples. In still further examples, a conductive sheet of metal (e.g., copper sheet), or other conductive material may be laminated on a surface of the nonconductive substrate of the circuit board, and an etching technique may be used to remove selected portions of the conductive sheet to leave behind the electrical connections.

As further shown in FIG. 2, the fiber optic cable subassembly 201 includes a strain relief device 211 configured to attach an end portion 213 of the fiber optic cable 203 to the circuit board 205, wherein the circuit board 205 provides strain relief for the fiber optic cable 203. As such, forces from the fiber optic cable 203 can be applied directly to the circuit board 205 by way of the strain relief device 211 which in turn transfers the forces to other portions of the connector such as surrounding housing 219 or other components. Forces from the fiber optic cable 203 are therefore isolated from the connections (i.e., attachment) of the optical fibers 301, 303 to the circuit board 205 and from a nose piece 1101 to the circuit board 205, for example, when forming an active optical cable assembly. In various examples of the disclosure, the strain relief device can comprise a sleeve clamped to the end portion 213 of the fiber optic cable 203. In the illustrated example, the sleeve can comprise a single piece sleeve that is clamped to the end portion 213 of the fiber optic cable 203. For instance, the sleeve may comprise a deformable material such as metal (e.g., brass, etc.) that may be selectively deformed, for example, by a crimping tool to crimp the sleeve to the end portion 213 of the fiber optic cable 203 by a crimping procedure, but other materials are possible for the sleeve such as polymers or the like. As shown in FIG. 5, the clamped sleeve can comprise a crimped sleeve 501 formed by crimping a sleeve about the end portion 213 of the fiber optic cable 203 using a crimping tool or the like. In other embodiments, the sleeve 315 could be molded onto the jacket or be a separate dielectric sleeve that is mechanically or chemically attached to the cable as desired.

In further examples, the sleeve can comprise multiple sleeve portions that are clamped together. For example, the sleeve can comprise a first portion that is screwed, or otherwise fastened to a second portion. The first and second portion can then be adjusted (e.g., by way of the fasteners), to clamp the first and second portion of the sleeve to the end portion 213 of the fiber optic cable 203. In further examples, the sleeve may include a set screw or other clamping member configured to clamp to the end of the fiber optic cable. In still further examples, the sleeve may be attached by chemical reaction, adhesive, press-fitting, or otherwise attaching the sleeve to the end portion 213 of the fiber optic cable 203.

The strain relief device 211 may optionally be configured to be attached (i.e., secured) to the cable jacket 309, for example, by clamping the sleeve to the outer surface of the cable jacket. For example, as shown in FIG. 5, the sleeve is crimped to an outer surface 503 of the cable jacket 309, but other variations for securing the sleeve to the cable are possible. By way of example, the strain relief device 211 may also be configured to be attached to strength members of the fiber optic cable. In other words, a strength member such as a metal wire or aramid material such as Kevlar® or strength element associated with the cable jacket 309 may be secured to the sleeve. For example, the strain relief device may include a sleeve crimped to elongated metal strength members and/or Kevlar® material associated with the fiber optic cable, and in some examples, without necessarily engaging the cable jacket. In still further configurations, the strain relief device may include a connection (with or without a crimped sleeve) between the circuit board 205 and an elongated metal strength members, Kevlar® material, cable jacket and/or other elements associated with the fiber optic cable 203.

As further shown in FIG. 2, the strain relief device 211 may also optionally include at least one mounting bracket 215a, 215b attaching the sleeve 501 (e.g., crimped sleeve or other sleeve configuration) to the circuit board 205. FIG. 2 illustrates two mounting brackets including a first mounting bracket 215a and a second mounting bracket 215b although a single mounting bracket or more than two mounting brackets may be provided in further examples. FIGS. 6 and 7 illustrate aspects of each mounting bracket 215a, 215b that are illustrated as identical to one another. While the mounting brackets may have non-identical configurations according to the concepts of the disclosure, providing identical mounting brackets 215a, 215b, can reduce the number of unique parts necessary to assemble the strain relief device 211 and therefore simplify assembly and stocking requirements for the brackets. FIG. 6 illustrates a top perspective view of the mounting brackets 215a, 215b while FIG. 7 illustrates a bottom perspective view of the mounting brackets 215a, 215b. Each mounting bracket 215a, 215b can include a central retaining structure 601 configured to facilitate capture of the sleeve 501. For instance, as shown in FIG. 7, the mounting bracket may include stops 701a, 701b defining a receiving channel 704 therebetween. As further shown, a pair of wings 703a, 703b may extend away from the receiving channel 704 and include engagement structures such as the illustrated tabs 705a, 705b. The wings 703a, 703b may also include complementary slots 707a, 707b. The distance "D" of the tabs 705a, 705b from the respective edges can be substantially identical to the distance "D" of the complementary slots 707a, 707b from the respective edges. As such, two identical mounting brackets 215a, 215b may be arranged with respect to one another such that the receiving channels 704 of the mounting brackets face one another with the mounting tabs 705a, 705b of one mounting bracket 215a being respectively received within the complementary slots 707b, 707a of the second mounting bracket 215b. Likewise, the mounting tables 705a, 705b of the second mounting bracket 215b can be respectively received within the complementary slots 707b, 707a of the first mounting bracket 215a. Simply stated, the mounting tabs and slots of the first mounting bracket are positioned so at to complimentarily engage with the mounting tabs and slots of the second mounting bracket and some embodiments use identical mounting brackets to reduce the number of distinct parts required. This allows the two mounting brackets to engage each other (respective mounting tabs and slots and in this embodiment secure by locking together while sandwiching the circuit board between the mounting brackets as discussed below. Other embodiments may use mounting brackets that do not lock but secure mounting brackets and attach the fiber optic cable to the circuit board.

As shown in FIG. 8, the circuit board 205 can include a support structure such at the nonconductive substrate 801 that includes a first engagement structure and the mounting bracket includes a second engagement structure mated with or locked with the first engagement structure for attaching the mounting bracket to the circuit board. In one particular example, one of the first and second engagement structure comprises an aperture and the other of the first and second engagement structure comprises a tab at least partially received by the aperture. Illustratively, the first engagement structure of the circuit board 205 can comprise apertures 803a-d while the second engagement structure of the mounting bracket 215a, 215b can comprise the tabs 705a, 705b at least partially received in a respective one of the apertures 803a-d.

Alternatively, in other embodiments the first engagement structure of the circuit board can comprise a tab while the second engagement structure of the mounting bracket can include an aperture configured to at least partially receive the tab. In further examples, the first and second engagement structure can include other tab features configured to cooperate with one another to provide attachment of the bracket to the circuit board. For example, the tabs may comprise truncated triangles configured to be press fit within the apertures to provide a press fit connection that does not necessarily require a crimping procedure (i.e. folding of the tab) to complete the attachment procedure.

In further examples, the first and/or second engagement structure can comprise distinct and separate mechanical structures (i.e., non-integrated structure) such as pins, screws, rivets, jumper wires or the like commonly used with the circuit board assemblies instead of tabs that are integrated with the mounting brackets. Such mechanical structures can cooperate with corresponding structures of the mounting bracket to provide a locking connection between the first and second engagement structure. For instance, notches in the mounting bracket can be used if there were pins or jumper wires (e.g., looped pins), standing up on the circuit board to connect with the notches.

In still further examples, the first and/or second engagement structures may comprise locations suitable to receive a fastening element therebetween to lock the first and second engagement structures. For example, the first and second engagement structures may comprise a surface suitable to receive an adhesive to lock the first and second engagement structures together. In still further examples, the first and second engagement structures may comprise a surface suitable to receive solder such that a solder or weld joint attaches the first and second engagement structures together.

The concepts of the disclosure may use a single mounting bracket for securing the sleeve 501 attached to the end of the cable to the circuit board 205 such as depicted in FIG. 8. For instance, sleeve 501 may be adhesively or mechanically attached to the single mounting bracket as desired. By way of example, a single mounting bracket could be formed to wrap about two surfaces of the circuit board and attached to the sleeve on both sides of the circuit board instead of using two separate mounting brackets if desired. However, more robust sub-assemblies may be constructed by using a first mounting bracket 215a attached to a first side of the circuit board 205 and a second mounting bracket 215b mounted to a second side of the circuit board 205 to capture the sleeve 501 between the first and second mounting brackets 215a, 215b. In other words, the circuit board 205 is sandwiched between the first mounting bracket 215a and the second mounting bracket 215b and the sleeve 501 is captured between the respective mounting brackets 215a,215b and disposed in receiving channel 704.

Figure 9:
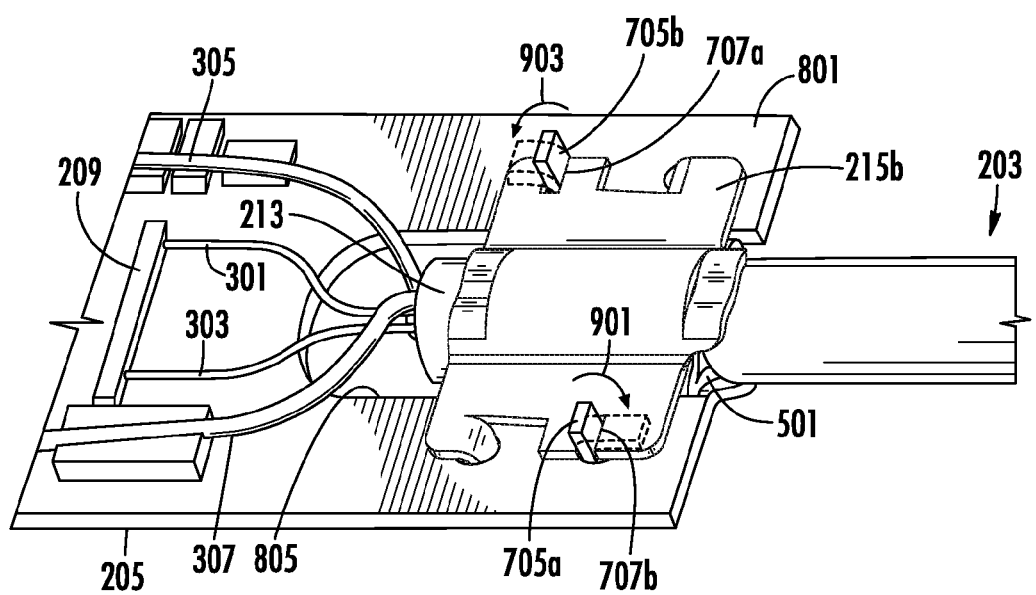
FIG. 9 illustrates a further embodiment using first and second mounting brackets positioned with respect to the circuit board and the step of crimping the mounting brackets to the circuit board to capture the clamped sleeve within an opening in the circuit board.

Further, as shown in FIGS. 8 and 9, the circuit board 205 may include an optional opening 805 configured to at least partially, or entirely, receive the end portion 213 of the fiber optic cable 203 within the opening 805 of the circuit board 205. In addition or alternatively, as shown, the optional opening 805 can be configured to at least partially, or entirely, receive the sleeve 501 within the opening 805 of the circuit board 205. Providing the end portion 213 and/or sleeve 501 at least partially within the opening can minimize the footprint of the circuit board necessary to mount the sleeve 501 and/or can facilitate a coplanar relationship between a symmetrical plane of the sleeve 501 and a plane of the circuit board 205. As such, the central axis of the end portion 213 of the fiber optic cable 203 can extend along the plane of the circuit board 205 to help prevent bending moments of the cable with respect to the circuit board when the circuit board receives forces (e.g., provides strain relief) from the fiber optic cable 203. Providing the end portion 213 and/or sleeve 501 at least partially within the opening of the circuit board can also provide a more compact circuit board footprint, reduce the height of the fiber on the circuit board and center the cable at the back of the housing. Stated another way, using an opening can provide a connector with a shorter length and/or a smaller height for the connector package. As shown, in FIG. 5, the crimped sleeve 501 can include a crimped width W1 that is substantially equal or less than the width W2 of the opening 805 as shown in FIG. 8. As such, the crimped sleeve 501 can be positioned within the opening to allow the sleeve to be attached to the circuit board 205.

Figure 12:
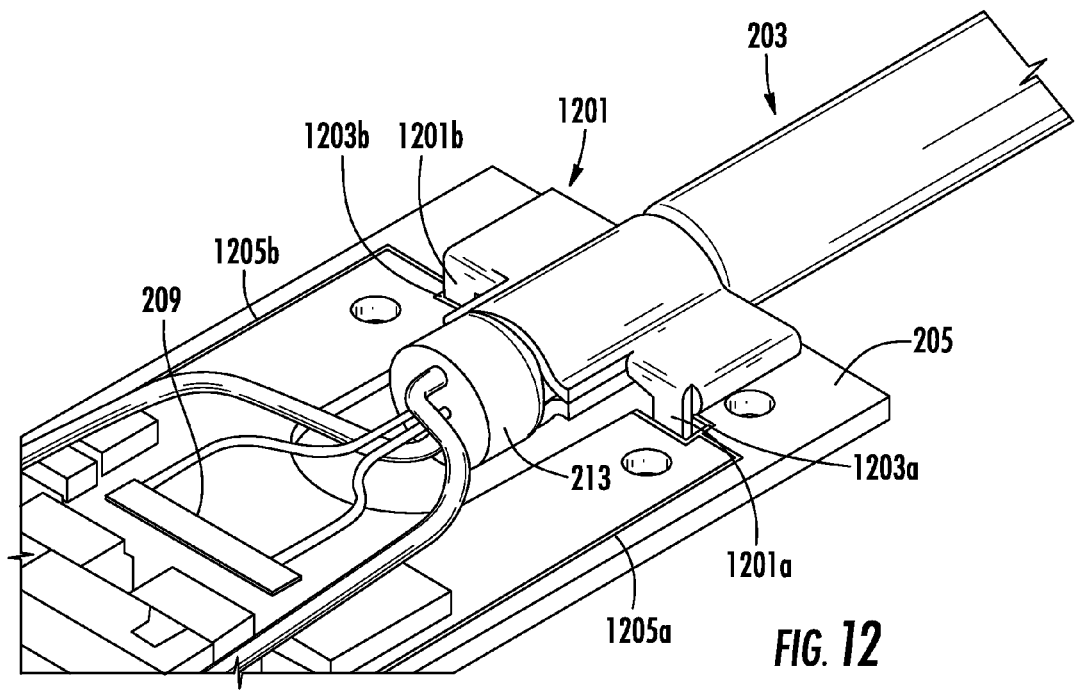
FIG. 12 illustrates a top perspective view of another example clamped sleeve for attaching the end portion of the fiber optic cable to the circuit board.
Figure 13:
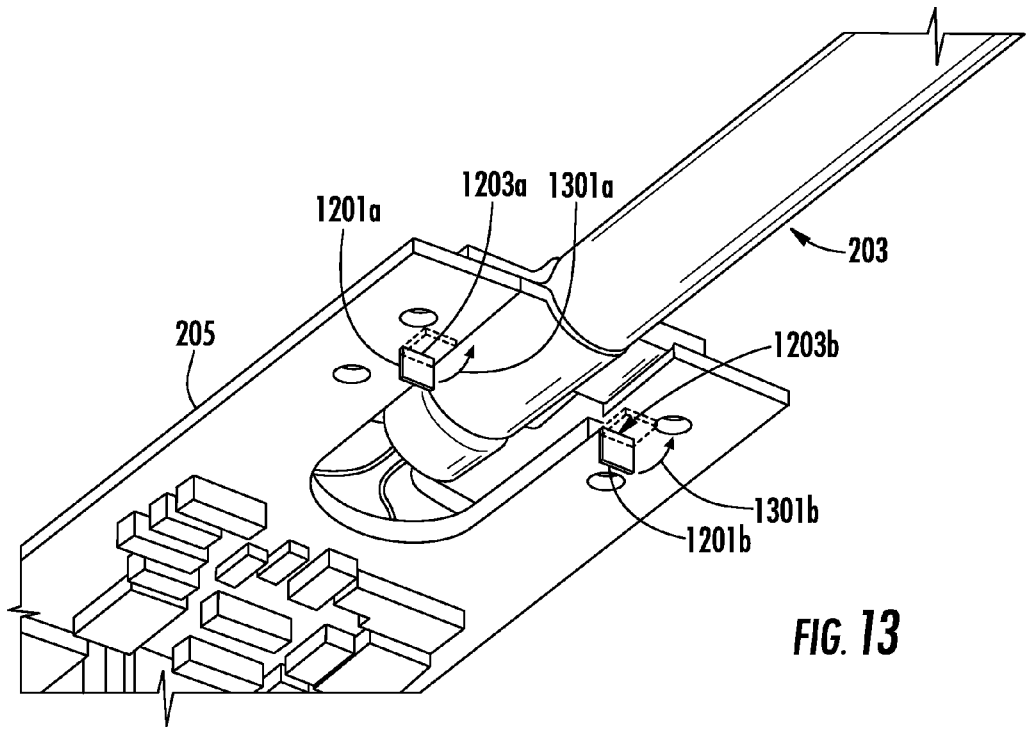
FIG. 13 is illustrates a bottom view of the example clamped sleeve of FIG. 12.

FIGS. 12 and 13 illustrate another example strain relief device according to the concepts disclosed herein. This strain relief device uses a sleeve 1201 without a separate mounting bracket. Providing a sleeve 1201 without a mounting bracket can reduce parts necessary to fabricate the fiber optic cable sub-assembly, thereby simplifying assembly and reducing inventory requirements. As shown, the sleeve 1201 can optionally comprise a single piece sleeve that may be clamped (e.g., crimped) or otherwise attached to the end portion 213 of the fiber optic cable 203 in accordance with the various methods discussed above. The circuit board 205 can include a first engagement structure and the sleeve 1201 can include a second engagement structure that cooperate for mating and/or locking with the first engagement structure for securing/attaching the end portion 213 of the fiber optic cable to the circuit board 205. As discussed previously, various engagement structures can be used that cooperate with one another to provide attachment of the end portion of the fiber optic cable to the circuit board. For example, one of the first and second engagement structure can comprise an aperture and the other of the first and second engagement structure comprises a tab at least partially received by the aperture. As shown in FIGS. 12 and 13, for example, the first engagement structure of the sleeve 1201 can comprise at least one tab 1201a, 1201b and the second engagement structure of the circuit board 205 can comprise at least one aperture such as the illustrated slots 1203a, 1203b with the tabs 1201*a*, 1201*b* at least partially received by the apertures (e.g., slots 1203*a*, 1203*b*) to attach the end portion of the fiber optic cable to the circuit board. Of course, sleeve 1201 can have other shapes and/or sizes for securing to the cable and the circuit board.

Figure 14:
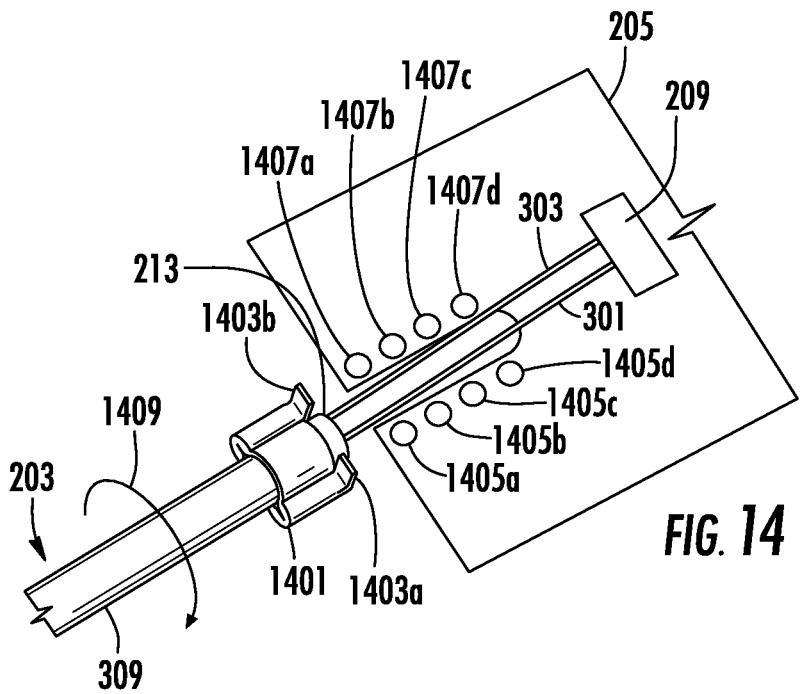
FIG. 14 illustrates yet another example clamped sleeve for attaching the end portion of the fiber optic cable to the circuit board.
Figure 15:
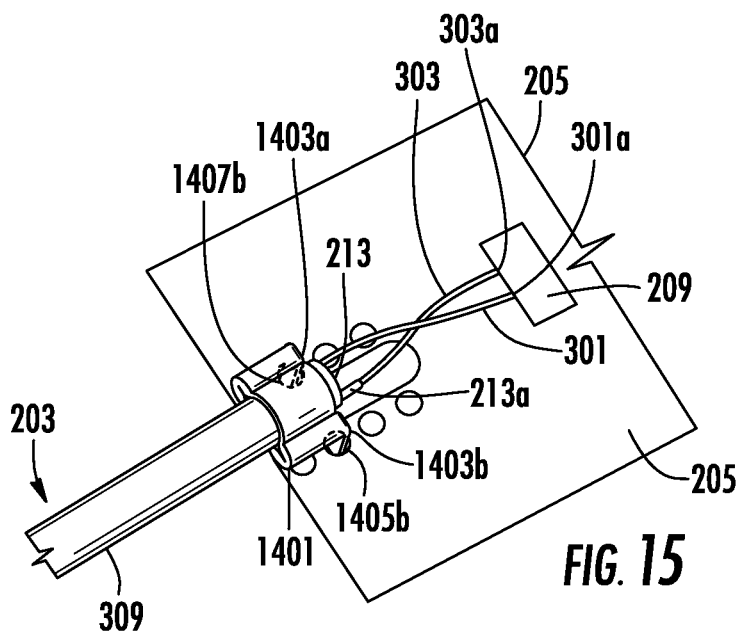
FIG. 15 illustrates a step of attaching the clamped sleeve of FIG. 14 to a circuit board.

Still other variations of strain relief devices are possible that do not use a separate mounting bracket as a discrete component. By way of example, FIGS. 14 and 15 illustrate still another example strain relief device that only comprises a sleeve 1401 without a separate mounting bracket. As shown, the sleeve 1401 can optionally comprise a single piece sleeve that may be clamped (e.g., crimped) or otherwise attached to the end portion 213 of the fiber optic cable 203 in accordance with the various methods discussed above. The circuit board 205 can include a first engagement structure and the sleeve 1201 can include a second engagement structure mated or locked with the first engagement structure to attach the end portion of the fiber optic cable to the circuit board. As discussed previously, various engagement structures can be used that cooperate with one another to provide attachment of the end portion of the fiber optic cable to the circuit board. For example, one of the first and second engagement structure can comprise an aperture and the other of the first and second engagement structure comprises a tab at least partially received by the aperture.

The alternative example embodiment of FIGS. 14 and 15 the engagement structure for securing to the circuit board is integrated into the sleeve. As shown in FIGS. 14 and 15, for example, the first engagement structure of the sleeve 1401 can comprise at least one tab 1403*a*, 1403*b* integrated with the sleeve 1401. In one example, the tabs 1403*a*, 1403*b* may be formed in the sleeve before clamping (e.g., crimping). Alternatively, the tabs 1403*a*, 1403*b* may be formed during or after clamping. In one example, the sleeve is clamped (e.g., crimped) while simultaneously forming the tabs 1403*a*, 1403*b*. For example, a stamping procedure may be used to crimp the sleeve while cutting portions of the sleeve to bend away from the base of the sleeve to form the tabs 1403*a*, 1403*b*. In still further examples, the sleeve may be clamped, then portions of the clamped sleeve may be trimmed and bent to form the tabs 1403*a*, 1403*b*.

Moreover, as shown, the tabs 1403*a*, 1403*b* may optionally be provided at the front end of the sleeve 1401 nearest corresponding end of the fiber optic cable 203. Providing the tabs 1403*a*, 1403*b* near the front end of the sleeve 1401 can help the sleeve further clamp down on the cable jacket since the tabs 1403*a*, 1403*b* can act as levers against the fulcrum point of the sleeve attachment; thereby resulting in pinching of the end of the sleeve when the fiber optic cable 203 is placed under sufficient tension.

As shown, the at least one tab 1403*a*, 1403*b* comprises two tabs although a single table or more than two tabs may be provided in further examples. In one example, while a single pair of tabs 1403*a*, 1403*b* is shown, in further examples two or more pairs of tabs may be provided to simultaneously engage 4, 6, 8 or more of the apertures 1405*a-d*, 1407*a-d*. Engaging four or more apertures simultaneously with a corresponding number of tabs can help arrest pivotal movement of the sleeve 1401 relative to the circuit board 205.

As further illustrated, the second engagement structure of the circuit board 205 can comprise a plurality of engagement structures to provide a plurality of alternate attachment locations of the strain relief device to the circuit board. For example, as shown, the circuit board 205 can include a plurality of apertures 1405*a-d*, 1407*a-d* configured to provide a plurality of attachment locations of the strain relief device to the circuit board. Indeed, as shown in FIG. 15, the tabs 1201*a*, 1201*b* can at least partially received by a respective pair of apertures (e.g., the apertures 1405*b*, 1407*b*) to selectively attach the end portion of the fiber optic cable to the circuit board at one of a plurality of alternate locations.

Optionally, any of the embodiments of the present disclosure may selectively attach the end portion 213 of the fiber optic cable 203 to the circuit board 205 such that the optical fibers 301, 303 extend along respective non-linear paths from the end portion 213 of the fiber optic cable 203. For example, as shown in FIG. 14, the at least one optical fiber comprises at least the first optical fiber 301 and the second optical fiber 303. As shown in FIG. 15, the fiber optic cable 203 may be arranged such as by twisting relative to the circuit board so the optic fibers can be have a curved path along a length between an end 213*a* of the cable jacket 309 and ends 301*a*, 303*a* of the first and second optical fibers 301, 303. Twisting or arranging the fiber optic cable may aid with allowing the optical fibers to have a curved pathway for taking up any excess length or pistoning of the optical fiber that may exist. Other embodiments can provide slack loops for the optical fibers if desired.

In accordance with still further examples of the disclosure, fiber optic sub-assemblies may be used to create a wide range of fiber optic cable assemblies. For example, the fiber optic sub-assembly 201 can be incorporated as part of the fiber optic cable assembly 101 illustrated in FIGS. 1 and 2. In one example, the fiber optic cable assembly includes a fiber optic cable including at least one optical fiber with the first fiber optic sub-assembly 201 forming a connector at a first end of the fiber optic cable 203. In further examples, a second fiber optic sub-assembly may be provided at a second end of the fiber optic cable 203. In one example, the first fiber optic sub-assembly can be substantially similar, such as identical, with the second fiber optic sub-assembly. As such, the fiber optic cable assembly may include the fiber optic cable 203 with the at least one optical fiber 301, 303. The fiber optic cable assembly 101 can further include a first and second fiber optic sub-assembly that each includes a respective first and second circuit board 205 including the active optical component 207 in operable communication with respective first and second ends of the optical fiber 301, 303. The first and second fiber optic sub-assemblies can each further include respective first and second strain relief devices 211. The first strain relief device attaches a first end portion of the fiber optic cable 203 to the first circuit board, wherein the first circuit board provides strain relief for the fiber optic cable. Likewise, the second strain relief device attaches the second end portion of the fiber optic cable 203 to the second circuit board, wherein the second circuit board provides strain relief for the fiber optic cable. As such, tension within the fiber optic cable can be transferred to respective forces directly applied to the respective first and second circuit boards.

Referring to FIG. 2, the fiber optic cable assembly 101 can further include an end cap device 217. As shown in FIG. 3, the end cap device 217 can further include a carrier structure 311 configured to support an end of the circuit board 205 within a housing 219 (see FIG. 2). Although, this embodiment shows end cap device 217 as two pieces an end cap 217*a* and a carrier 217*b*, other variations may configure the end cap device as a single piece if desired. The end cap device 217 further includes an passageway 313 configured to receive the fiber optic cable 203. The fiber optic cable assembly 101 can also include a first shield 221*a* and a second shield 221*b* configured to be snapped together to house and shield the circuit board 205. In this specific embodiment, the carrier 217b supports the rear end of the circuit board using carrier structure 311 for attaching the circuit board with the carrier structure being secured between shields 221a,221b when assembled and the front end of the circuit board is electrically attached to a connector nose 1101 for allowing electrical connection with a device. Moreover, the first shield 221a may be provided with snapping connectors 223 configured to be snappingly received within corresponding interior notches (not shown) of an interior surface of the housing 219. Other variations of cable assemblies using the concepts of the application could use other connector noses or the like for similar or other protocols as desired to create other types of assemblies. Still other variations may have a housing 219 that is overmolded about a portion of shields 221a,221b.

In accordance with the various example configurations, such as but not limited to the configurations discussed above, methods of assembling a fiber optic cable subassembly can include the step of operably attaching at least one optical fiber 301, 303 to the active optical component 207 of the circuit board 205 (i.e., positioning the optical fiber in optical communication so it can transmit or receive optical signals with the active optical component). The method can then include the step of attaching the end portion 213 of the fiber optic cable 203 to the circuit board 205 using the strain relief device. Once attached, the circuit board can provide strain relief for the fiber optic cable. Indeed, a tension in the fiber optic cable 203 can be transferred directly to the circuit board, rather than other housing components of the connector. Thus, the forces are inhibited from degrading the optical communication between the optical fibers and active optical components, thereby preserving alignment and optical performance.

Various strain relief devices can be used to attached the fiber optic cable 203 to the circuit board 205. In one example, the strain relief device can comprise various connections, joints, adhesive connections, or other strain relief devices configured to directly attach the end portion of the fiber optic cable to the circuit board. In one example, the method can include the step of clamping (e.g., crimping or the like) a sleeve to the fiber optic cable and attaching the clamped sleeve to the circuit board. For example, as shown in FIGS. 3 and 4, an uncrimped sleeve 315 may be provided and the end portion 213 of the fiber optic cable 203 may be inserted within the interior area of the uncrimped sleeve 315. Next, the sleeve may be clamped, such as crimped, to the end portion 213 of the fiber optic cable 203 as shown by the crimped sleeve 501 illustrated in FIG. 5. As used herein, "clamped" means that the sleeve is secured to the end of the cable by any suitable method such as mechanical and/or chemical methods such examples of mechanical means are crimping (i.e., deforming the sleeve), mechanical attaching such as using an adhesive, press-fitting, wedging, screwing or threading onto, using a set screw, and examples of chemical methods are chemical reactions, melting or molding a polymer sleeve about the polymer cable jacket, chemically reactive adhesives and/or other suitable securement methods.

The clamped sleeve 501 can then be attached to the circuit board 205. For example, the method can include the step of attaching one or more mounting brackets to the circuit board for attaching the clamped sleeve to the circuit board. For instance, as shown in FIG. 8, the first mounting bracket 215a can be positioned relative to a first side of the circuit board with the tabs 705a, 705b being inserted through respective apertures 803d, 803a of the circuit board 205. As shown, the clamped sleeve 501 can then be cradled within the channel 704 of the first mounting bracket 215a with the stops 701a, 701b straddling respective opposed end edges 807a, 807b of the clamped sleeve 501.

Next, as shown in FIG. 9, the second mounting bracket 215b can be positioned relative to the second side of the circuit board with the tabs 705a, 705b being inserted through respective apertures 803b, 803c. As shown, the tabs 705a, 705b of the first mounting bracket 215a also extend through the respective slots 707b, 707a of the second mounting bracket 215b. Similarly, although not shown, the tabs 705a, 705b of the second mounting bracket 215b likewise also extend through the respective slots 707b, 707a of the first mounting bracket 215a. Once positioned, the clamped sleeve 501 is also cradled within the channel 704 of the second mounting bracket 215b with the stops 701a, 701b also straddling respective opposed end edges 807a, 807b of the clamped sleeve 501.

The method can also include the step of crimping the mounting bracket to the circuit board to attach the clamped sleeve to the circuit board although other techniques (e.g., soldering, welding, adhesives, etc.) may also be used with or without the step of crimping. As represented by arrows 901, 903 in FIG. 9, the tabs 705a, 705b of the first mounting bracket 215a can be bent down to lock the mounting brackets 215a, 215b together. Likewise, although not shown the tabs 705a, 705b of the second mounting bracket 215b can also be bent down to further lock the mounting brackets 215a, 215b together. Once the mounting brackets 215a, 215b are secured such as by locking together, the clamped sleeve 501 is captured within the respective channels 704 by way of the corresponding stops 701a, 701b of the mounting brackets 215a, 215b. Indeed, an axial movement of the clamped sleeve 501 will be limited by an engagement of at least one of the end edges 807a, 807b by the corresponding stops 701a, 701b.

FIGS. 12 and 13 illustrate another example of attaching the end portion 213 of the fiber optic cable to the circuit board 205, wherein the circuit board 205 provides strain relief for the fiber optic cable 203. For instance, the clamped sleeve 501 can be attached directly to the circuit board 205 without the use of a mounting bracket since the engagement structure is integrated into the sleeve. Indeed, as shown, the crimped sleeve 1201 can include tabs 1201a, 1201b that may be inserted within apertures (e.g., slots 1203a, 1203b). As shown by arrows 1301a, 1301b in FIG. 13, the tabs can then be crimped to the circuit board such clamped sleeve is effectively crimped directly to the circuit board to attach the clamped sleeve 1201 to the circuit board 205.

FIGS. 14 and 15 illustrate another example of attaching the end portion 213 of the fiber optic cable to the circuit board 205, wherein the circuit board 205 provides strain relief for the fiber optic cable 203. For instance, the clamped sleeve 501 can be attached directly to the circuit board 205 without the use of a mounting bracket. Indeed, as shown, the crimped sleeve 1401 can include integrated tabs 1403a, 1403b that may be inserted within a selected pair of apertures 1405a-d, 1407a-d. As shown schematically by the interface 1501, the tabs 1403a, 1403b can then be soldered, glued or otherwise attached (e.g., crimping) with respect to the circuit board.

In any of the methods of the present invention, the step of attaching the clamped sleeve to the circuit board can optionally position the clamped sleeve at least partially within the opening 805 of the circuit board 205. In addition or alternatively, any of the methods herein may also include the step of providing a curved path in the optical fibers by twisting the cable relative to the circuit board. In one example, as shown in FIG. 14, the method can include the step of operably attaching a pair of optical fibers to the active optical component (e.g., by way of the lead frame 209). The optical fibers 301, 303 may be attached while the tabs 1403*a*, 1403*b* face upwardly as shown in FIG. 14. As such, the optical fibers 301, 303 may extend along paths that do not cross one another and may even extend parallel to one another as shown in FIG. 14. Next, the crimped sleeve 1401 may be rotated as suitable such as about 180° about arrow 1409 such that the pair of optical fibers 301, 303 of the fiber optic cable extend along a respective curved path such as the substantially S-shaped path shown in FIG. 15. The optical fibers are shown to cross over one another wherein a reduced space can be achieved while still allowing each optical fiber 301, 303 to extend along a curved path. Allowing the fibers to extend along a curved path can provide more axial flexibility than substantially straight fibers. Indeed, an axial force applied to a substantially straight fiber may apply significant rigidity as the optical fiber resists buckling under the force. However, providing the fibers to extend along a curved path by bending allows flexibility with force application when compared to a substantially straight optical fiber.

In any of the examples herein, the methods may further include the step of electrically grounding the strain relief device to a ground track on the circuit board. For instance, as shown in FIG. 12, the tabs 1201*a*, 1201*b* may interface with a ground track 1205*a*, 1205*b* to electrically ground the strain relief device.

Figure 10:
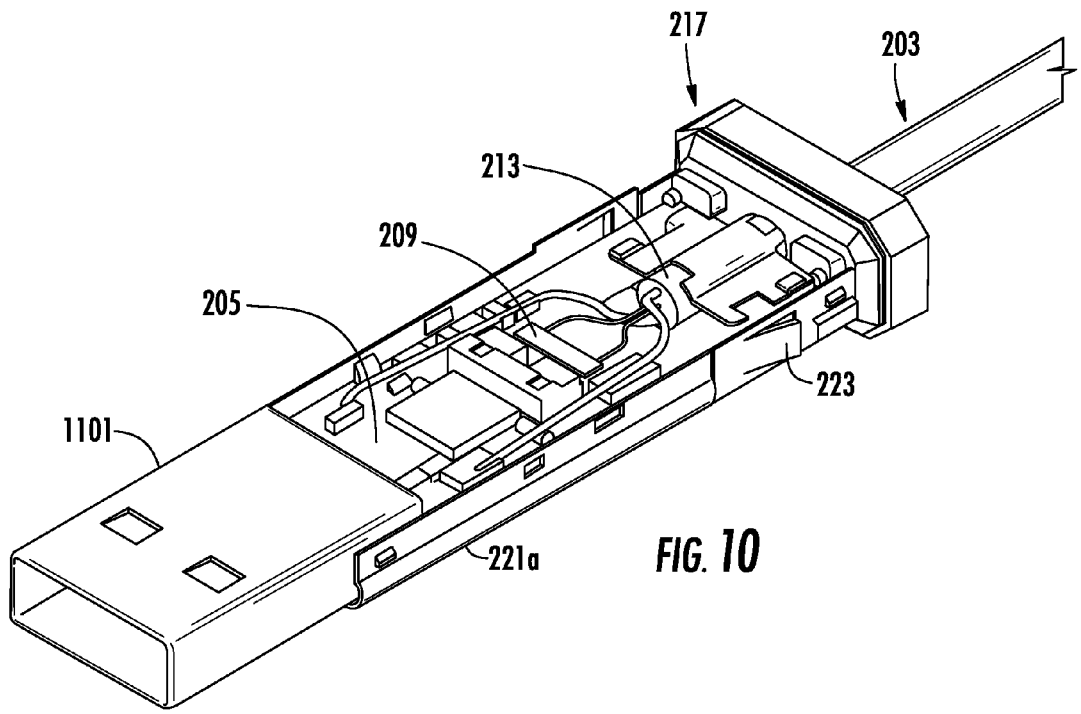
FIG. 10 illustrates the step of engaging the end cap device such that a carrier structure supports an end of the circuit board and the step of attaching a first shielding member about the circuit board.
Figure 11:
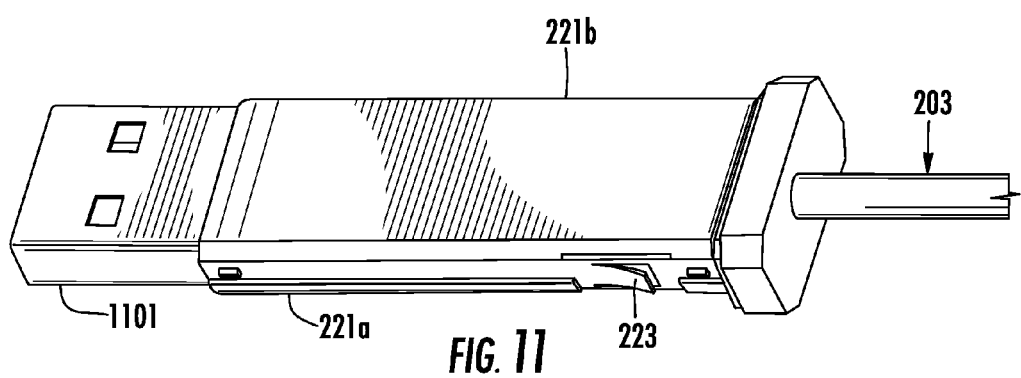
FIG. 11 illustrates the step of attaching a second shielding member with respect to the first shielding member.

As shown in FIG. 10, the method of assembling the fiber optic assembly 101 can optionally continue with mounting the fiber optic cable sub-assembly to the end cap device 217. The end cap device 217 can be moved forward with the forward end edge of the circuit board being supported by the carrier structure 311. Next, the first shield 221*a* can be mounted to the circuit board 205. As shown in FIG. 11, the second shield 221*b* can then be mounted with respect to the first shield 221*a* such that the first and second shields 221*a*, 221*b* cooperate to shield the circuit board 205. As shown in FIG. 1, a rear end of the housing 219 can then be inserted over the nose 1101 and slid down such that the nose 1101 protrudes from the front end of the housing 219. Once the rear end of the housing 219 abuts the end cap device 217, the snap connectors 223 engage interior connecting structures of the housing 219 to lock the housing 219 in place.

Aspects of the disclosure can allow the circuit board, rather than other components of the connector, to provide direct strain relief for the fiber optic cable. As such, the connector size and complexity can be reduced. Moreover, the strain relief device may be mounted within an opening in the circuit board to reduce or even prevent any increase in the overall footprint of the circuit board. Still further, one or more mounting brackets may be provided to capture a crimped sleeve within the opening. In some examples, the crimped sleeve can be captured within the opening such that the axis of the end portion of the fiber optic cable extends along a plane of the circuit board. As such, the circuit board may provide strain relief without creating a substantial bending moment of the fiber optic cable relative to the circuit board. Moreover, the crimped sleeve, if provided, can be optionally electrically connected to a ground track of the circuit board to allow EMI shielding in some applications.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A fiber optic cable sub-assembly comprising:
a fiber optic cable including at least one optical fiber;
a circuit board including an opening and an active optical component in operable communication with the optical fiber, wherein an end portion of the fiber optic cable is at least partially positioned within the opening of the circuit board; and
a strain relief device attaching the end portion of the fiber optic cable to the circuit board.

2. The fiber optic cable sub-assembly of claim 1, wherein the strain relief device comprises a sleeve clamped to the end portion of the fiber optic cable.

3. The fiber optic cable sub-assembly of claim 2, wherein the sleeve is crimped to the end portion of the fiber optic cable.

4. The fiber optic cable sub-assembly of claim 2, wherein the circuit board includes a first engagement structure and the sleeve includes a second engagement structure that interacts with the first engagement structure to attach the end portion of the fiber optic cable to the circuit board.

5. The fiber optic cable sub-assembly of claim 4, wherein one of the first and second engagement structure comprises an aperture and the other of the first and second engagement structure comprises a tab at least partially received by the aperture.

6. The fiber optic cable sub-assembly of claim 2, wherein the strain relief device further comprises at least one mounting bracket attaching the sleeve to the circuit board.

7. The fiber optic cable sub-assembly of claim 6, wherein the at least one mounting bracket includes a first mounting bracket attached to a first side of the circuit board and a second mounting bracket attached to a second side of the circuit board to capture the sleeve between the first and second mounting brackets.

8. The fiber optic cable sub-assembly of claim 6, wherein the circuit board includes a first engagement structure and the mounting bracket includes a second engagement structure locked with the first engagement structure to attach the sleeve to the circuit board.

9. The fiber optic cable sub-assembly of claim 8, wherein one of the first and second engagement structure comprises an aperture and the other of the first and second engagement structure comprises a tab at least partially received by the aperture.

10. The fiber optic cable sub-assembly of claim 2, wherein the fiber optic cable further includes a cable jacket that houses the optical fiber, and the sleeve is clamped to an outer surface of the cable jacket.

11. The fiber optic cable sub-assembly of claim 1, wherein at least one of the strain relief device and the circuit board include a plurality of engagement structures to provide a plurality of alternate attachment locations of the strain relief device to the circuit board.

12. The fiber optic cable sub-assembly of claim 1, wherein the at least one optical fiber comprises at least a first optical fiber and a second optical fiber, and the fiber optic cable further includes a cable jacket that houses the first and second optical fibers, wherein the fiber optic cable is arranged along a length between an end of the cable jacket and ends of the first and second optical fibers for placing a curved path in the first and second optical fibers.

13. The fiber optic cable sub-assembly of claim 1, wherein the strain relief device is electrically grounded by a ground track of the circuit board.

14. A fiber optic cable assembly comprising:
a fiber optic cable including at least one optical fiber;
a first fiber optic sub-assembly including:
   a first circuit board including an active optical component in operable communication with a first end of the optical fiber; and
   a first strain relief device attaching a first end portion of the fiber optic cable to the first circuit board; and
a second fiber optic sub-assembly including:
   a second circuit board including an active optical component in operable communication with a second end of the optical fiber; and
   a second strain relief device attaching a second end portion of the fiber optic cable to the second circuit board, wherein the second circuit board provides strain relief for the fiber optic cable.

15. The fiber optic cable assembly of claim 14, further comprising an end cap device including a carrier structure supporting an end of the first circuit board within a housing.

16. A method of assembling a fiber optic cable sub-assembly comprising the steps of:
providing a fiber optic cable and a circuit board;
positioning an end portion of the fiber optic cable within an opening of the circuit board;
clamping a sleeve to an end of the fiber optic cable; and
securing the end portion of the fiber optic cable to the circuit board.

17. The method of claim 16, further including the step of attaching the clamped sleeve to the circuit board.

18. The method of claim 17, further comprising the step of crimping the clamped sleeve to the circuit board to attach the clamped sleeve to the circuit board.

19. The method of claim 17, further comprising the step of attaching a mounting bracket to the circuit board to attach the clamped sleeve to the circuit board.

20. The method of claim 19, further comprising the step of crimping the mounting bracket to the circuit board to attach the clamped sleeve to the circuit board.

21. The method of claim 16, further including a step of arranging the fiber optic cable so the optical fibers extend along respective curved paths.

22. A cable sub-assembly comprising:
a cable including at least one communication element;
a circuit board in operable communication with the at least one communication element, the circuit board comprising an opening, wherein an end portion of the fiber optic cable is at least partially positioned within the opening of the circuit board; and
a strain relief device attaching the end portion of the cable to the circuit board.

23. The fiber optic cable assembly of claim 14, wherein:
the first circuit board includes a first opening, and the first end portion of the fiber optic cable is at least partially disposed in the first opening; and
the second circuit board includes a second opening, and the second end portion of the fiber optic cable is at least partially disposed in the second opening.

24. A fiber optic cable sub-assembly comprising:
a fiber optic cable including at least one optical fiber;
a circuit board including an active optical component in operable communication with the optical fiber; and
a strain relief device comprising a sleeve clamped to an end portion of the fiber optic cable, wherein the sleeve attaches the end portion of the fiber optic cable to the circuit board.

25. The fiber optic cable sub-assembly of claim 24, wherein the circuit board includes a first engagement structure and the sleeve includes a second engagement structure that interacts with the first engagement structure to attach the end portion of the fiber optic cable to the circuit board.

* * * * *